United States Patent [19]

Pham et al.

[11] Patent Number: 4,941,004
[45] Date of Patent: * Jul. 10, 1990

[54] PRINTER APPARATUS

[75] Inventors: Hieu T. Pham, Webster; Yee S. Ng, Fairport; Kenneth D. Kieffer; Pin S. Tschang, both of Rochester; Eric K. Zeise, Pittsford, all of N.Y.

[73] Assignee: Eastman Kodak Company, Rochester, N.Y.

[*] Notice: The portion of the term of this patent subsequent to May 16, 2006 has been disclaimed.

[21] Appl. No.: 320,733

[22] Filed: Mar. 8, 1989

Related U.S. Application Data

[63] Continuation of Ser. No. 199,981, May 27, 1988, Pat. No. 4,831,395, which is a continuation of Ser. No. 132,638, Dec. 9, 1987, abandoned, which is a continuation of Ser. No. 33,550, Apr. 1, 1987, abandoned.

[51] Int. Cl.$^5$ ............................................. G01D 15/00
[52] U.S. Cl. ..................................... 346/160; 346/154
[58] Field of Search ................... 346/154, 160, 107 R, 346/108, 139 R; 358/300, 302; 355/233

[56] References Cited

U.S. PATENT DOCUMENTS

| | | | |
|---|---|---|---|
| 3,947,840 | 3/1976 | Craford et al. | 346/160 |
| 4,216,393 | 8/1980 | Gillberg et al. | 346/160 |
| 4,417,240 | 11/1983 | Ahmed | 346/160 |
| 4,455,562 | 6/1984 | Dolan et al. | 346/160 |
| 4,524,372 | 6/1985 | De Cock et al. | 346/160 |
| 4,525,729 | 6/1985 | Agulnek et al. | 346/160 |
| 4,571,602 | 2/1986 | De Schamphelaere et al. | 346/160 |
| 4,575,739 | 3/1986 | De Schamphelaene et al. | 346/154 |
| 4,590,487 | 5/1986 | Noguchi et al. | 346/160 |
| 4,596,995 | 6/1986 | Yamakawa et al. | 346/160 |
| 4,653,895 | 3/1987 | Deguchi et al. | 346/160 |
| 4,831,392 | 5/1989 | Dei | 346/154 |

FOREIGN PATENT DOCUMENTS

| | | | |
|---|---|---|---|
| 3422907 | 1/1985 | Fed. Rep. of Germany | 346/160 |
| 5973983 | 10/1982 | Japan | 346/160 |
| 61-185981 | 8/1986 | Japan | 346/160 |
| WO87/02162 | 4/1987 | PCT Int'l Appl. | |
| 2104266 | 3/1983 | United Kingdom | 346/160 |

OTHER PUBLICATIONS

J. Burkhart et al., A Monolithically Integrated 128 LED–Driver and its Application, IEEE Transactions on Consumer Electronics, vol. CE-32, No. 1, Feb. 1986, pp. 26–31.

*Primary Examiner*—Arthur G. Evans
*Attorney, Agent, or Firm*—Norman Rushefsky

[57] ABSTRACT

An improved printer apparatus includes a print head having a series of point-like radiation sources, such as LED's, arranged in a row for exposing a recording medium. Logic means is provided for determining which of the point-like radiation sources are to be selected for energization. A current driver means responsive to the logic means provides electrical current to the radiation sources selected. A current driver means include a current mirror having a master circuit for generating a reference current and a plurality of slave circuits for providing respective driver currents to the radiation sources selected for energization. The master circuit includes a resistor of the type that at least prior to adjustment permits for substantially continuous adjustment of driver current over a range of resistance values.

Two independent power supplies are provided to the print head. One power supply provides electrical energy for the logic device at a fixed voltage suitable for the logic devices. A second power supply provides the electrical energy for illuminating the point-like radiation sources. Thus, power to the logic devices is isolated from noise generated during energization of the point-like radiation sources. A variable voltage is provided by this second power supply to permit for flexibility in adjustment of the currents to the point-like radiation sources. This variable voltage may be adjusted in response to aging of the LED's or temperature of the print head.

12 Claims, 7 Drawing Sheets

PRINTER APPARATUS

Cross Reference to Related Applications

This application is a continuation of U.S. application Ser. No. 199,981, filed May 27, 1988 now U.S. Pat. No. 4,831,395 which in turn is a continuation of U.S. application Ser. No. 132,638, filed Dec. 9, 1987 now abandoned which in turn is a continuation of U.S. application Ser. No. 033,550, filed Apr. 1, 1987 now abandoned.

BACKGROUND OF THE INVENTION

1. Field of the Invention

The present invention relates to non-impact printing apparatus for recording on a moving photoreceptor and a print-head for use therewith.

2. Brief Description of the Prior Art

In the prior art as exemplified by U.S. Pat. No. 4,571,602 printing apparatus is described which comprises a multiplicity of individually addressable and energizable point-like radiation sources, such as LED's, arranged in rows for exposing points upon a photoreceptor during movement thereof relative to and in a direction normal to the rows. Driver circuits are provided for simultaneously energizing the radiation sources responsive to respective data bit input signals applied to the driver circuits during an information line period. The print or recording head includes a support upon which are mounted chips placed end to end and upon each of which are located a group of LED's. The driver circuits are incorporated in chips and located to each side of the linear array of LED chips. The driver circuits in this apparatus include a shift register for serially reading-in data-bit signals and for driving respective LED's in accordance with the data signals.

Associated with each driver chip is an input pad onto which a current-level control signal is applied. The signal determines the mean current that is produced by a driver into its corresponding LED's. Reference is made to mean current because, due actual current through an LED may be up to e.g. 10% larger or smaller than the desired nominal value. In order to set the control signal, four resistors in series are provided between a line carrying a five volt DC voltage and the driver chip. By shorting out one or more of the four different resistors, 15 different possible combinations of current control signals can be made. The current control signal fixed for that driver chip is not fed to the LED's but is instead used to generate a larger actual current that passes through the LED's selected to be energized by the data signals.

A problem with the apparatus described in the aforementioned patent is that 15 levels of control provide an undesirable design limination. A mean current to one group of LED's that is higher than that to an adjacent group of LED's in the same row will provide reproductions with varying patterns of lines. The eye is very sensitive in detecting low frequency pattern lines in reproductions. While differences in light output between adjacent LED's may not be significant to the eye, differences of mean light output between adjacent groups of LED's tend to degrade image quality, particularly in reproductions of pictorial information.

A further disadvantage of the apparatus of the prior art is that of lacking the ability to provide for easy and preferably automatic maintenance of LED light output to correct for changes in light output resulting from aging or other changes to the print head.

A further disadvantage over the apparatus of the prior art is the offsetting of adjacent LED's into staggered rows and the requirement that circuitry be provided for illuminating the rows at staggered times.

It is, therefore, an object of the invention to provide an improved printer apparatus and print head for use therewith which overcomes the problems of the prior art.

SUMMARY OF THE INVENTION

The improved printer apparatus of the invention includes a print head having a series of point-like radiation sources arranged in a row for exposing a recording medium. Logic means is provided for determining which of the point-like radiation sources are to be selected for energization. A current driver means responsive to the logic means provides electrical current to the radiation sources selected for energization. The improvement to the apparatus is characterized by having the current driver means include a current having a master circuit for generating a reference current and a plurality of slave circuits for providing respective driver currents to the radiation sources selected for energization. The master circuit being further characterized by including a resistor of the type that at least prior to adjustment permits for substantially continuous adjustment of driver current over a range of resistance values.

Two independent power supplies are provided to the print head. One power supply provides electrical energy for the logic device at a fixed voltage suitable for the logic devices. A second power supply provides the electrical energy for illuminating the point-like radiation sources. Thus, power to the logic devices is isolated from noise generated during energization of the point-like radiation sources. A variable voltage is provided by this second power supply to permit for flexibility in adjustment of the currents to the point-like radiation sources. This variable voltage may be adjusted in response to aging of the LED's or temperature of the print head.

DESCRIPTION OF THE PREFERRED APPARATUS

The apparatus of the preferred embodiment will be described in accordance with an electrophotographic recording medium. The invention, however, is not limited to apparatus for creating images on such a medium, as other media such as photographic film etc. may also be used with the invention.

DETAILED DESCRIPTION OF THE PREFERRED EMBODIMENTS

Because electrophotographic reproduction apparatus are well known the present description will be directed in particular to elements forming part of or cooperating more directly with the present invention. Apparatus not specifically shown or described herein are selectable from those known in the prior art.

Figure 1:
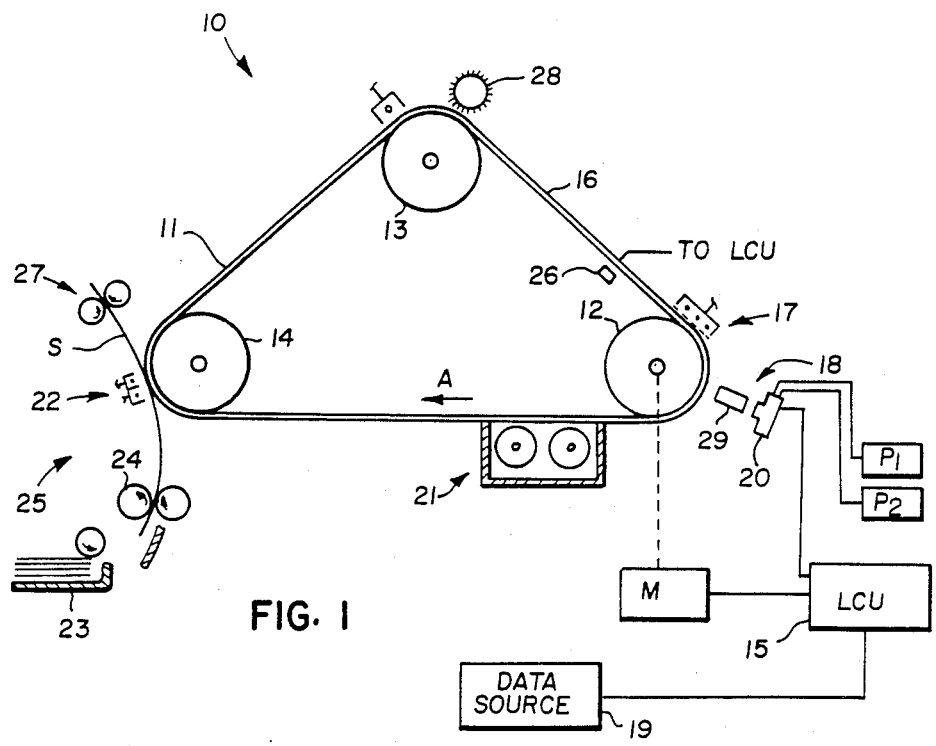
FIG. 1 is a schematic of a print apparatus made in accordance with the invention.

With reference now to FIG. 1, an electrophotographic reproduction apparatus 10 includes a recording medium such as a photoconductive web 11 or other photosensitive medium that is trained about three transport rollers 12, 13 and 14, thereby forming an endless or continuous web. Roller 12 is coupled to a driver motor M in a conventional manner. Motor M is connected to a source of potential when a switch (not shown) is closed by a logic and control unit (LCU) 15. When the switch is closed, the roller 12 is driven by the motor M and moves the web 11 in clockwise direction as indicated by arrow A. This movement causes successive image area of the web 10 to sequentially pass a series of electrophotographic work stations of the reproduction apparatus.

For the purpose of the instant exposure, several work stations are shown along the web's path. These stations will be briefly described.

First, a charging station 17 is provided at which the photoconductive surface 16 of the web 11 is sensitized by applying to such surface a uniform electrostatic primary charge o a predetermined voltage. The output of the charger may be controlled by a grid connected to a programmable power supply (not shown). The supply is in turn controlled by the LCU 15 to adjust the voltage level Vo applied onto the surface 16 by the charger 17.

At an exposure station 18 an electrostatic image is formed by modulating the primary charge on an image area of the surface 16 with selective energization of point-like radiation sources in accordance with signals provided by a data source 19. The point-like radiation sources are supported in a print head 20 to be described in more detail below.

A development station 21 includes developer which may consist of iron carrier particles and electroscopic toner particles with an electrostatic charge opposite to that of the latent electrostatic image. Developer is brushed over the photoconductive surface 16 of the web 11 and toner particles adhere to the latent electrostatic image to form a visible toner particle, transferable image. The development station may be of the magnetic brush type with one or two rollers. Alternatively, the toner particles may have a charge of the same polarity as that of the latent electrostatic image and develop the image in accordance with known reversal development techniques.

The apparatus 10 also includes a transfer station 25 shown with a corona charger 22 at which the toner image on web 11 is transferred to a copy sheet S; and a cleaning station 28, at which the photoconductive surface 16 of the web 11 is cleaned of any residual toner particles remaining after the toner images have been transferred. After the transfer of the unfixed toner images to a copy sheet S, such sheet is transported to a heated pressure roller fuser 27 where the image is fixed to the copy sheet S.

As shown in FIG. 1, a copy sheet S is fed from a supply 23 to driver rollers 24, which then urge the sheet to move forward onto the web 5 in alignment with a toner image at the transfer station 25.

To coordinate operation of the various work stations 17, 18, 21, and 25 with movement of the image areas on the web 5 past these stations, the web as a plurality of indicia such as perforations along one of its edges. These perforations generally are spaced equidistantly along the edge of the web 11. At a fixed location along the path of web movement, there is provided suitable means 26 sensing web perforations. This sensing produces input signals into the LCU 15 which has a digital computer, preferably a microprocessor. The microprocessor has a stored program responsive to the input signals for sequentially actuating, then de-actuating the work stations as well as for controlling the operation of many other machine functions. Additional encoding means may be provided as known in the art for providing more precise timing signals for control of the various functions of the apparatus 10.

Programming of a number of commercially available microprocessors in a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

Figure 2:
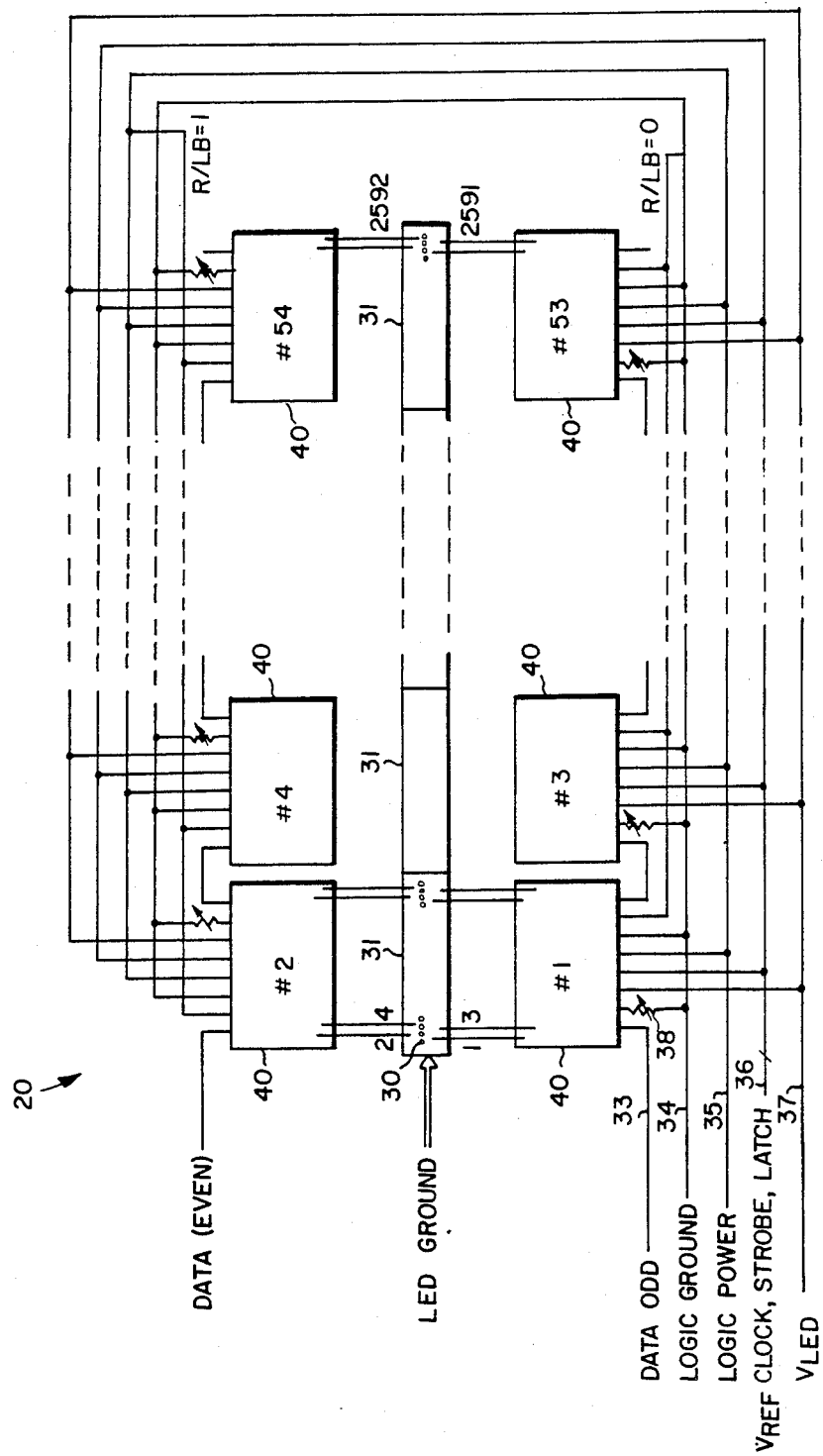
FIG. 2 is a block diagram of circuitry used in forming the print head of FIG. 1 in accordance with the invention.

With reference to FIGS. 1 and 2, the print head 20, as noted, is provided with a multiplicity of energizable point-like radiation sources 30, preferably light-emitting diodes (LED's). Optical means 29 may be provided for focusing light from each of the LED's onto the photoconductive surface. The optical means preferably comprises an array of optical fibers such as sold under the name Selfoc, a trademark for a gradient index lens array sold by Nippon Sheet Glass, Limited. Due to the focusing power of the optical means 29, a row of emitters will be imaged on a respective transverse line on the recording medium.

With reference to FIG. 2, the print head 20 comprises a suitable support with a series of LED chips 31 mounted thereon. Each of the chips 31 includes in this example 96 LED's arranged in a single row. Chips 31 are also arranged end-to-end in a row and where twenty-seven LED chips are so arranged, the print head will extends across the width of the web 11 and include 2592 LED's arranged in a single row. To each side of this row of LED's there are provided twenty-seven identical driver chips 40. Each of these driver chips include circuitry for addressing the logic associated with each of 48 LED's to control whether or not the LED should be energized as well as to determine the level of current to each of the LED's controlled by that driver chip 40. Two driver chips 40 are thus associated with each chip of 96 LED's. Each of the two driver chips will be coupled for driving of alternate LED's. Thus, one driver chip will drive the odd numbered LED's of the 96 LED's and the other will drive the even numbered LED's of these 96 LED's. The driver chips 40 are electrically connected in parallel to a plurality of lines 34–38 providing various electrical control signals. These lines provide electrical energy for operating the various logic devices and current drivers in accordance with their voltage requirements. A series of line 36 (indicated by a single line in this FIG.) provide clock signals and other pulses for controlling the movement of data to the LED's in accordance with known techniques. As may be noted in FIG. 2, external to each driver chip 40 is a variable resistor 38 that is schematically illustrated and will be described in greater detail below. A data line 33 is also provided for providing data signals in the form of either a high or low logic level. The driver chips each include a data in and data out port so that they serially pass data between them.

Figure 3:
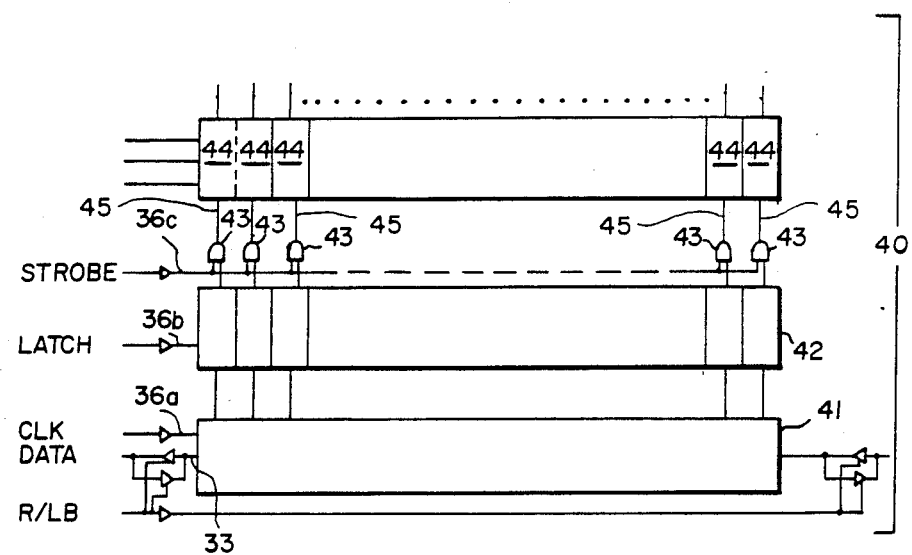
FIG. 3 is a block diagram of a driver circuit for use in the print head of FIG. 2.

With reference now to FIG. 3, the architecture for each driver chip 40 includes a 48 bit bidirectional shift register 41. A logic signal carried over line R/LB determines the direction data will flow down this register. Assume that this chip is enabled to cause data to flow down the register from left to right as shown in FIG. 3. Data thus enters shift register 41 over line 33 through the driver chip's data-in port at the left from say the data-out port of a driver chip immediately to the left or from the LCU if the driver chip 40 is the first chip for data to enter. Data exits from this chip at the data-out port to be input to the next adjacent driver chip to the right of driver chip 40. In operation for each line of image to be exposed in the main scanning direction, i.e., transverse to that of movement of the recording medium 11 data from the data source suitably rasterized, in accordance with known techniques, streams serially through the shift registers under control of clock pulses provided by the LCU over line 36a. When 2592 bits of data (1's or 0's) are stored by the shift registers of all of the driver chips, a latch signal is provided over line 36b to latch this data into latch registers 42 so that the shift registers 41 may commence filling with data signals for the next line of exposure. Forty-eight latch registers 42 are provided in each driver chip to receive the data shifted out n parallel fashion from the shift register 41. Each latch register is associated with a particular LED and adjacent latch registers are associated with every other LED. A logic AND gate 43 is associated with each latch register and has one input coupled to the output of its respective latch register and its other input coupled to a line 36c for providing a strobe or timing pulse from the LCU. This strobe pulse determines when to trigger the LED's to turn on in relation to the position of the recording medium and the duration for which the LED's are turned on. All the AND gates have one of their inputs connected to this strobe line. The output of each of the AND gates is coupled to a logic circuit that is part of a constant current driver circuit 44.

Figure 4:
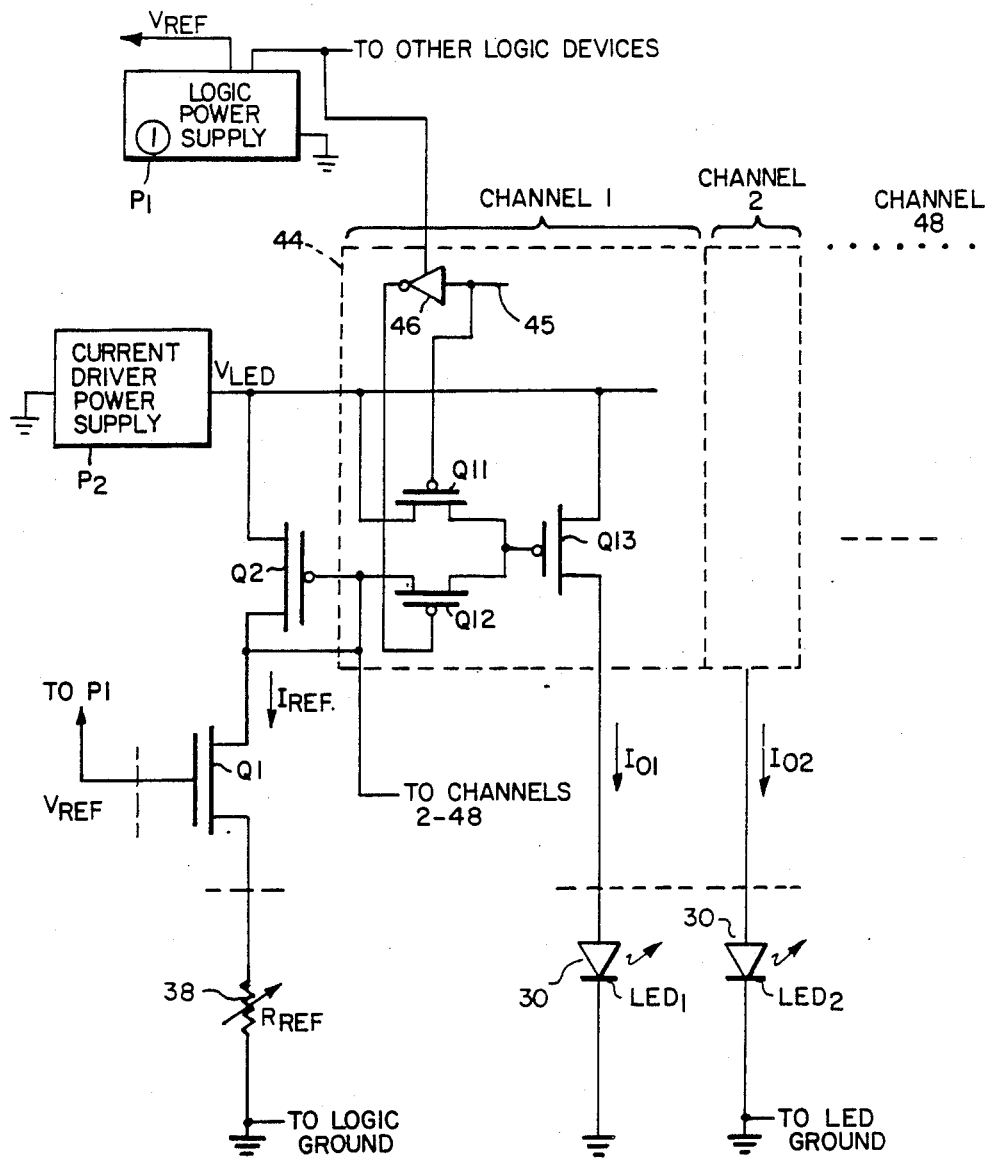
FIG. 4 is a schematic of a current driving circuit for the driver circuit of FIG. 3.

With reference now to FIG. 4, the output of each AND gate is fed over line 45 to a logic circuit that includes a logic inverter and three p-channel enhancement mode MOSFET's (metal-oxide semiconductor field-effect transistors) Q11, Q12, and Q13. Transistor Q11 has its gate terminal connected to the input of the inverter and its source terminal connected to the line labeled $V_{LED}$ carrying a voltage of, say 4.5 volts. The drain terminals of transistors Q11 and Q12 are both connected to the gate terminal of transistor Q13. The output of the inverter 46 is connected to the gate terminal of transistor Q12. The source terminal of transistor Q12 is connected to the gate of a similar type transistor Q2. Transistor Q2 is coupled to the line $V_{LED}$ at its source terminal. The drain terminal of transistor Q2 is coupled to the drain terminal of an n-channel enhancement mode transistor Q1. The gate terminal of Q2 is also connected to its drain terminal. A variable voltage source $V_{REF}$ is coupled to the gate terminal of transistor Q1 and the source terminal is coupled to the variable resistor $R_{REF}$, previously described. The circuit described comprises a current mirror in that current $I_{REF}$, through a master circuit that includes the line carrying $V_{LED}$, transistor Q2, transistor Q1 and $R_{RED}$ to ground, is mirrored or proportionally maintained in each of the identical slave circuits, one of which shown comprises the line carrying $V_{LED}$, transistor Q13, an LED, and ground.

The operation of this current mirror will now be described. It will be appreciated that each slave circuit forming a part of this driver circuit will behave in the same manner, assuming a same logic signal is provided. With a "high" logic signal provided by the AND gate to the input of inverter 46, the output of the inverter goes to a logic low level and transistor Q12 turns on, due to a negative potential difference between the gate of transistor Q12 and its source terminal and causes current $I_{01}$ to flow through $LED_1$. Current $I_{01}$ is proportional to current $I_{REF}$ flowing through the master circuit due to transistors Q2 and Q13 having approximately the same source potentials and gate potentials. Transistor Q1 controls the level of $I_{REF}$ in accordance with the input voltage $V_{REF}$ at its gate terminal. The level of current $I_{REF}$ is also controlled by the valve of the resistor $R_{REF}$ that is in series with transistors Q2 and Q1. As noted above, the output of the inverter 46 goes to a "low" logic level due to the concurrence of a logic "high" input signal on the AND gate's 43 data terminal and a logic "high" strobe or trigger pulse signal on its other input terminal. When the strobe pulse drops down to a logic "low" level, the output of AND gate 43 goes "low" and the output of inverter 46 goes to a logic "high" level and turns off transistor Q12 and turns on transistor Q11. This removes the needed bias for transistor Q13 to operate and it, too, turns off or ceases to conduct, thereby preventing any current from flowing to $LED_1$. Thus, the on-time for exposing each pixel on the recording medium is determined by the strobe signal and the amount of current controlling the brightness of this LED is controlled by the level of the current $I_{01}$.

An important feature of the invention is having $R_{REF}$ be adjustable over a continuous range of resistance values. During calibration of the print head, measurements are taken of the mean or average light output of the forty-eight LED's driven by a respective driver chip and compared with the light output needed or specified for proper exposure of the recording medium. The reference voltage may be set at 3.0 volts during this measurement. The reference resistor $R_{REF}$ is of the known laser trimmable type wherein portions may be vaporized off so that while measurements of light output are taken, the resistance is adjusted until the light output measured matches that specified. In resistors of this type, the material vaporized results in reduction of the effective cross-sectional area for the resistor thereby affecting its conductivity.

Figure 5:
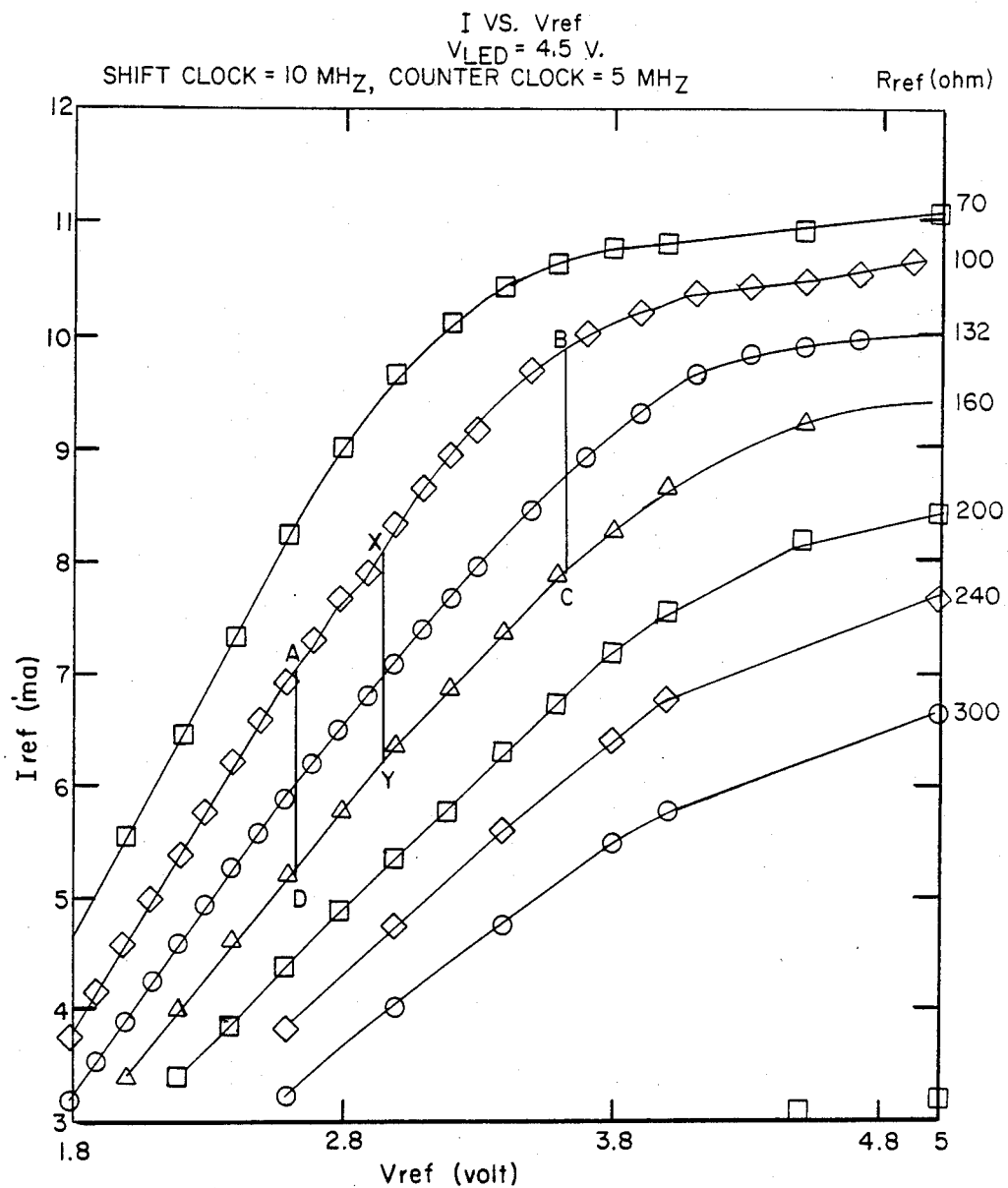
FIG. 5 is a graph illustrating a preferred range of parameters for operating the circuit of FIG. 4.
Figure 6A:
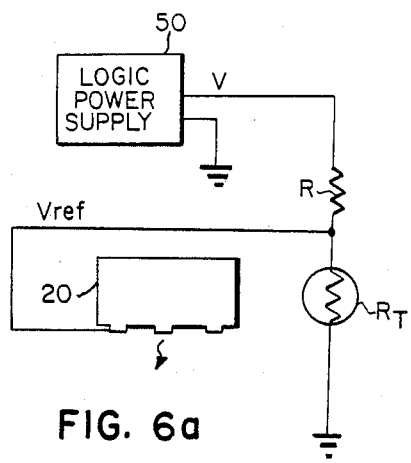
FIG. 6a and 6b are schematics of alternate circuits for use with the apparatus of FIG. 1.

Each of the groups of 48 LED's is calibrated in a similar manner so that their respective resistor $R_{REF}$ is adjusted accordingly. The resistors and driver chips may now be encapsulated to prevent further adjustment. With the print head mounted as shown in FIG. 1, adjustments for variation in light output due to aging and/or environmental conditions will now be described. As shown in FIG. 6a, a logic device power supply 50 outputs a calibrated voltage V. A voltage divider circuit is provided in which one of the resistors, $R_T$, is a positive temperature coefficient thermistor attached to the print head at a location that is reasonably representative of the temperature of the LED's. The LEd's used in this print head have decreased light output with elevation in temperature. To compensate for this, the resistance $R_T$ will increase, thereby, providing an increase to the reference voltage used to drive transistor Q1. This effects the master current level $I_{ref}$ as shown in FIG. 5. As may be noted in this figure, the preferred operating range for each driver chip 40 is in the range indicated by the somewhat parallelogram-shaped figure having the vertices A, B, C and D. In one embodiment of a print head, values of $R_{REF}$ might range from 100 to 160 ohms. $V_{LED}$ can be maintained constant at 4.5 volts. $V_{REF}$ could be thus adjusted over the range from 2.6 volts to 3.6 volts. It will be noted that providing the type of operating range as shown in FIG. 5 has important advantages in making adjustments to maintain the appropriate level of illumination output by the LED's. In this example, assuming $V_{REF}$ is 2.6 volts, the currents to the various subgroups of LED's will range from 5 ma to 7 ma or each LED of any subgroup of LED's will receive a current indicated by some point on line AD. Line AD thus represents the locus of points for the currents to the LED's at the selected $V_{REF}$ of 2.6 volts. It will be noted that as $V_{REF}$ increases towards 3.6 volts, the locus, x y, of similar points but for a different $V_{REF}$ shifts upwardly but does not change the relative differentials in current received by the LED's. Thus, LED's in a subgroup having a driver chip with an $R_{REF}$ of 160 ohms might have a current of 5.2 amps for a $V_{REF}$ of 2.6 volts (point D), while another subgroup having a driver chip with an $R_{REF}$ of 100 ohms might have a current of 7.1 ma (point A). The difference in current between a respective LED in each of these subgroups is 1.9 ma per LED. With a need for a change of $V_{REF}$ to say 3.0 volts due to a need to compensate for aging or thermal affects upon light outputs by the LED's, the operating parameters of the LED's have shifted generally uniformly both upwardly and to the right on this graph. The new current locus, x y, indicates that the subgroup of LED's formerly operating at point A now has 8.1 ma of current that will pass through each LED of that subgroup while that operating at point D will now have a current of 6.2 ma. The difference in current between respective LED's remains at 1.9 ma. The circuit described thus provides in addition a simplification to calibration since with adjustments of a parameter such as $V_{REF}$ the expected respective currents to the LED's can be readily calculated. This facilitates also the providing of different references voltages, $V_{REF}$, for compensating for different "ages" of the LED's. The "age" of an LED may be defined by the number of times it has been used rather than its chronological age.

Figure 6B:
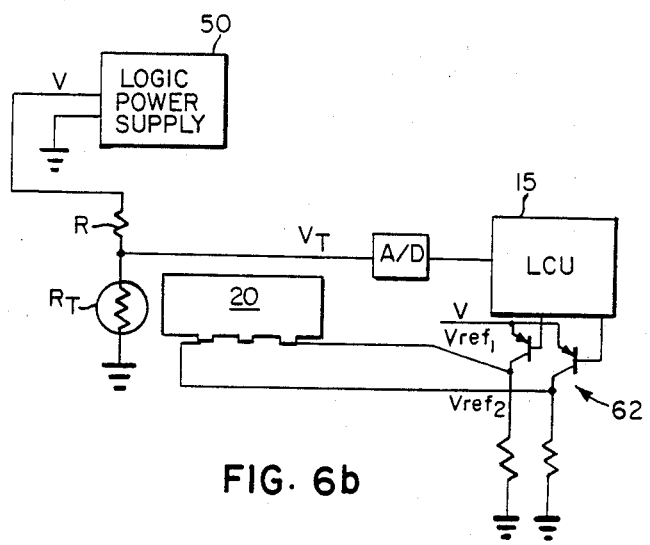
Figure 7A:
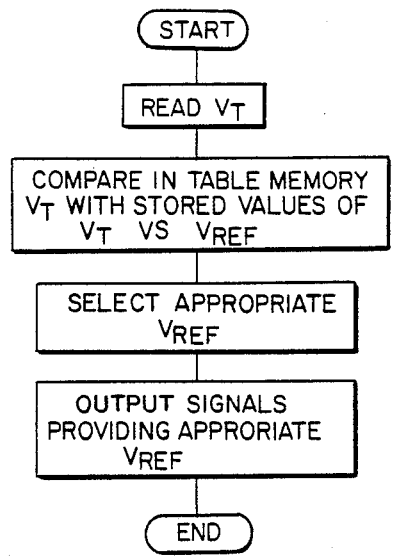
FIG. 7a and 7b are flowcharts for a program for operating the print apparatus in accordance with certain aspects of the invention.

With reference now to FIG. 6b, an alternate circuit for adjusting $V_{REF}$ is shown. In this embodiment, changes in resistance of thermistor $R_T$ due to temperature changes of the print head 20 cause corresponding changes in voltage $V_T$. The voltage $V_T$ is sensed by analog to digital (A/D) converter 60 and fed to the LCU 15. The LCU would include input buffers for temporarily storing inputs from the A/D converter until such inputs can be handled by the LCU's central processor. Associated with the central processor are program memory units and temporary memory units. In the program memory a subroutine program can be provided for determining adjustments to $V_{REF}$ in response to readings of $V_T$. One approach as indicated in the flowchart of FIG. 7a is to have a program which includes a table memory for comparing predetermined stored relationship between $V_T$ and $V_{REF}$. The program will thus compare the sensed value for $V_T$ with that in the table and selected an appropriate $V_{REF}$. An output driver 62 then adjusts $V_{REF}$ to each driver chip in accordance with the value stored in memory. Another approach is to provide a mathematical equation between the values of $V_{REF}$ and $V_T$ and have the LCU calculate $V_{REF}$.

Figure 7B:
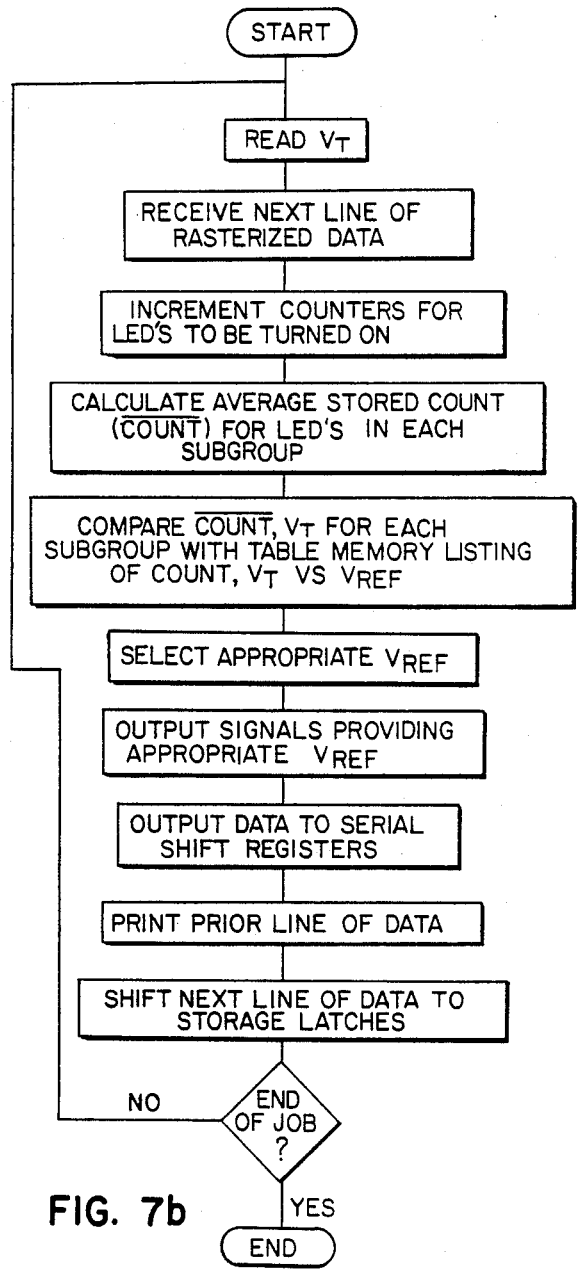

In the flowcharge of FIG. 7b, age of a driver chip is also accounted for as well as thermal affects. This flowchart will also be described with regard to the circuit of FIG. 6b. As noted above, the LCU 15 controls the flow of data to the shift registers. Since this form of data is in the form of binary digits (1's or 0's) the data for use in enabling an LED for each main scan line may be noted by registers in the LCU and a count maintained of the number of times each LED is enabled. Periodically, a calculation may be made by the LCU to determine the average or mean number (or count) of firings for the LED's of that subgroup driven by a particular driver chip. This average number along with updated sensings of $V_T$ may be compared with a table memory listing comparing these variables with appropriate values $V_{REF}$. A selected appropriate $V_{REF}$ is then outputted by the series of up to 54 drivers 62 to each of the driver chips in accordance with print head temperatures and average age of that subgroup. Thus, for any driver chip the current to the subgroup of LED's driven by that driver chip have their current adjusted in accordance with the temperature of the print head and the average age of the LED's in that subgroup.

As may be noted in the schematic of FIG. 4, two separate power supplied with separate ground or return lines are provided to the print head. One power supply $P_1$ is used to provide the energy needed to run the logic devices such as inverters 46 (and AND gates, registers and latches etc. shown in FIG. 3). It will be appreciated that an inverter 46 is provided for each of the slave circuits and thus for each LED. The second power supply $P_2$ is used for providing the electrical energy for powering the current driver circuit; i.e. $V_{LED}$. As may be noted a variable adjustable tap may be provided at power supply $P_1$ to allow an operator to adjust $V_{REF}$ as an alternative to automatic adjustment in response to print head temperature. In this way, the large transients or noise created by energization of the LED's during commencement and termination of printing of each line are effectively isolated from the logic devices to thereby immunize them from specious signals. Power consumption is also minimized by running the various devices at their optimum levels. Thus, the LED's may have their driver voltage $V_{LED}$ made lower than the 5 volts used to drive the logic devices.

The invention has been described in detail with particular reference to preferred embodiments thereof, but it will be understood that variations and modifications can be effected within the spirit and scope of the invention.

We claim:

1. In a printing apparatus for exposing a light sensitive recording medium; a print head including a series of point-like radiation sources arranged in a row for exposing the medium; means for moving the medium relative to the print head; means providing data signals representing data to be printed; logic means responsive to the data signals for determining which of the point-like radiation sources are to be selected for energization; current driver means responsive to the logic means for providing electrical current to the radiation sources selected for energization; the improvement which comprises:

wherein the current driver means includes a current mirror having a master circuit for generating a reference current and a plurality of slave circuits for providing respective driver currents to the radiation sources selected for energization; the master circuit being characterized by a resistor means of the type that at least prior to final adjustment permits for adjustment of driver currents through change of resistance values and wherein the master circuit further includes a variable voltage source for also permitting adjustment of the levels of driver currents.

2. The apparatus of claim 1 and including automatic adjustment means for sensing the need for adjustment of driver currents and for providing adjustment in said currents by changing the level of current in the reference current.

3. The apparatus of claim 2 and wherein the automatic adjustment means includes means for sensing the temperature of the print head.

4. The apparatus of claim 3 and wherein the variable voltage source is provided by a power supply independent of a power supply for the logic means.

5. The apparatus of claim 2 wherein the variable voltage source is provided by a power supply independent of a power supply for the logic means.

6. The apparatus of claim 1 and wherein the variable voltage source is provided by a power supply independent of a power supply for the logic means.

7. In a printing apparatus for exposing a light sensitive recording medium; a print head including a series of point-like radiation sources arranged in a row for exposing the medium; means for moving the medium relative to the print head; means providing data signals representing data to be printed; logic means responsive to the data signals for determining which of the point-like radiation sources are to be selected for energization; current driver means responsive to the logic means for providing electrical current to the radiation sources selected for energization; the improvement which comprises:

wherein the current driver means includes a current mirror having a master circuit for generating a reference current and a plurality of slave circuit for providing respective driver currents to the radiation sources selected for energization; the master circuit being characterized by an adjustable conducting means of the type that at least prior to final adjustment permits for adjustment of driver currents through change of conductivity values and wherein the master circuit further includes a variable voltage source for also permitting adjustment of the levels of driver currents.

8. The apparatus of claim 7 including automatic adjustment means for sensing the need for adjustment of driver currents and for providing adjustment in said currents by changing the level of current in the reference current.

9. The apparatus of claim 8 and wherein the automatic adjustment means includes means for sensing the temperature of the print head.

10. The apparatus of claim 9 and wherein the variable voltage source is provided by a power supply independent of a power supply for the logic means.

11. The apparatus of claim 8 and wherein the variable voltage source is provided by a power supply independent of a power supply for the logic means.

12. The apparatus of claim 7 and wherein the variable voltage source is provided by a power supply independent of a power supply for the logic means.

* * * * *